US009231821B2

(12) United States Patent
Arumugam et al.

(10) Patent No.: US 9,231,821 B2
(45) Date of Patent: Jan. 5, 2016

(54) VLAG PIM LINK FAILOVER USING PIM HELLO MESSAGE

(71) Applicant: INTERNATIONAL BUSINESS MACHINES CORPORATION, Armonk, NY (US)

(72) Inventors: Sivakumar Arumugam, Milpitas, CA (US); Chidambaram Bhagavathiperumal, Santa Clara, CA (US); Angu S. Chandra Sekaran, Santa Clara, CA (US); Ashok K. Somosundaram, Santa Clara, CA (US)

(73) Assignee: GlobalFoundries Inc., Grand Cayman (KY)

( * ) Notice: Subject to any disclaimer, the term of this patent is extended or adjusted under 35 U.S.C. 154(b) by 153 days.

(21) Appl. No.: 14/081,675

(22) Filed: Nov. 15, 2013

(65) Prior Publication Data

US 2015/0138951 A1  May 21, 2015

(51) Int. Cl.
*H04L 12/24* (2006.01)
*H04L 12/931* (2013.01)
*H04L 12/703* (2013.01)
*H04L 12/761* (2013.01)
*H04L 12/939* (2013.01)
*H04L 12/18* (2006.01)
*H04L 12/751* (2013.01)
*H04L 12/709* (2013.01)

(52) U.S. Cl.
CPC ............ *H04L 41/0654* (2013.01); *H04L 45/28* (2013.01); *H04L 49/70* (2013.01); *H04L 12/18* (2013.01); *H04L 45/026* (2013.01); *H04L 45/16* (2013.01); *H04L 45/245* (2013.01); *H04L 49/55* (2013.01)

(58) Field of Classification Search
None
See application file for complete search history.

(56) References Cited

U.S. PATENT DOCUMENTS

| 7,719,958 | B1 * | 5/2010 | Azimi et al. ................... 370/220 |
| 9,036,634 | B2 * | 5/2015 | Arumugam et al. ........... 370/390 |
| 2008/0275975 | A1 * | 11/2008 | Pandey et al. ................. 709/223 |
| 2012/0027017 | A1 * | 2/2012 | Rai et al. ....................... 370/392 |
| 2012/0033672 | A1 * | 2/2012 | Page et al. ................. 370/395.53 |
| 2012/0163162 | A1 | 6/2012 | Zhang |
| 2012/0188909 | A1 | 7/2012 | Previdi et al. |
| 2013/0003733 | A1 * | 1/2013 | Venkatesan et al. .......... 370/390 |
| 2014/0369186 | A1 * | 12/2014 | Ernstrom et al. ............. 370/228 |
| 2015/0188722 | A1 | 7/2015 | Bhagavathiperumal et al. |

* cited by examiner

*Primary Examiner* — Vinncelas Louis
(74) *Attorney, Agent, or Firm* — Matthew C. Zehrer

(57) ABSTRACT

A system for PIM vLAG fast link failover recovery includes a first vLAG switch connected to a second vLAG switch by an ISL. The first vLAG switch is connected to an upstream network device by a failed link and the second vLAG switch is connected to the upstream network device by a functional link. To recover from the failed link, the first vLAG switch transmits a ROUTEUPDATE message to the second vLAG switch upon the ISL that instructs the second vLAG switch to receive data traffic from the upstream network device and forward the data traffic to the first vLAG switch upon the ISL.

16 Claims, 4 Drawing Sheets

| PIM Version | Type = 0 | Reserved | Checksum | Option 1 | Option 2 | ... | Option N | Option N+1 |
|---|---|---|---|---|---|---|---|---|
| | | | | TLV | TLV | | TLV | Type=3(ROUTE UPDATE) Length=8 Value=A.B.C.D/255.255.255.0 |

350

| PIM Version | Type = 0 | Reserved | Checksum | Option 1 | Option 2 | ... | Option N | Option N+1 |
|---|---|---|---|---|---|---|---|---|
| | | | | TLV | TLV | | TLV | Type=4(NEW SOURCE) Length=8 Value=A.B.C.D/255.255.255.0 |

360

VLAG PIM LINK FAILOVER USING PIM HELLO MESSAGE

FIELD

Embodiments of invention generally relate to networking and network systems, and more particularly to virtual link aggregation group (vLAG) Protocol Independent Multicast (PIM) link failover recovery.

DESCRIPTION OF THE RELATED ART

PIM is a group of multicast routing protocols for Internet Protocol (IP) networks that supports one-to-many and many-to-many data distribution over a LAN, WAN, Internet, etc. PIM does not include its own topology discovery mechanism, but instead uses routing information supplied by other traditional routing protocols such as Open Shortest Path First, Intermediate System to Intermediate System, Routing Information Protocol and Border Gateway Protocol, etc. There are four variants of PIM. A particular variant, PIM Dense Mode (PIM-DM), uses dense multicast routing and builds shortest-path trees by flooding multicast traffic domain wide, and reduces branches of the tree where no receivers are present.

One basic premise of PIM-DM is that a multicast packet flow has receivers at most locations. Therefore, PIM-DM is ideal for groups where many of the nodes will subscribe to receive multicast packets. In PIM-DM the source initially broadcasts to every node directly connected to it. The neighboring nodes further forward the data to it's neighbors. When a node does not wish to receive a particular node's or group of node's data, it sends a Prune message to indicate its lack of interest. Upon receiving a Prune message, the node will modify its state so that it will not forward those packets out to that node or group of nodes.

Further, in many data center environments or networks, downstream servers or switches connect to upstream devices which consolidate traffic. A switch in the data center environment or network access layer may be connected to more than one switch in the data center environment or network aggregation layer in order to provide for network redundancy. The Spanning Tree Protocol (STP) may be used to prevent broadcast loops, blocking redundant link paths. However, this has the unwanted consequence of reducing the available bandwidth between the layers. In addition, STP may be slow to resolve topology changes that occur during a link failure, and can result in considerable MAC address flooding.

Using Virtual Link Aggregation Groups (vLAGs), the redundant links remain active, utilizing all available bandwidth. Using vLAGs, paired vLAG peers appear as a single virtual entity for the purpose of establishing a multi-port trunk. vLAG capable switches synchronize their logical view of the access layer port structure and internally prevent implicit loops. The vLAG topology also responds to link failure and improves unnecessary MAC flooding. vLAGs are also useful in multi-layer environments for both link and downlink redundancy to any regular link aggregation group device.

SUMMARY

In a first embodiment of the present invention, a system for PIM vLAG fast link failover recovery includes a network comprising a first vLAG switch connected to a second vLAG switch by an ISL. The first vLAG switch is connected to an upstream network device by a failed link and the second vLAG switch is connected to the upstream network device by a functional link. To recover from the failed link, the first vLAG switch transmits a ROUTEUPDATE message to the second vLAG switch upon the ISL that instructs the second vLAG switch to receive data traffic from the upstream network device and forward the data traffic to the first vLAG switch upon the ISL.

In another embodiment of the present invention, a method for PIM vLAG fast link failover recovery includes transmitting, with the first vLAG switch, the ROUTEUPDATE message to the second vLAG switch connected to the first vLAG switch by the ISL to instruct the second vLAG switch to receive data traffic from the upstream network device; receiving, with the second vLAG switch, data traffic from the upstream network device, and; forwarding, with the second vLAG switch, the data traffic to the first vLAG switch upon the ISL.

In another embodiment of the present invention, a computer program product for PIM vLAG fast link failover recovery includes a computer readable storage medium having program code embodied therewith, the program code executable to: transmit, with the first vLAG switch, the ROUTEUPDATE message to the second vLAG switch; receive, with the second vLAG switch, data traffic from the upstream network device, and; forward, with the second vLAG switch, the data traffic to the first vLAG switch upon the ISL.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
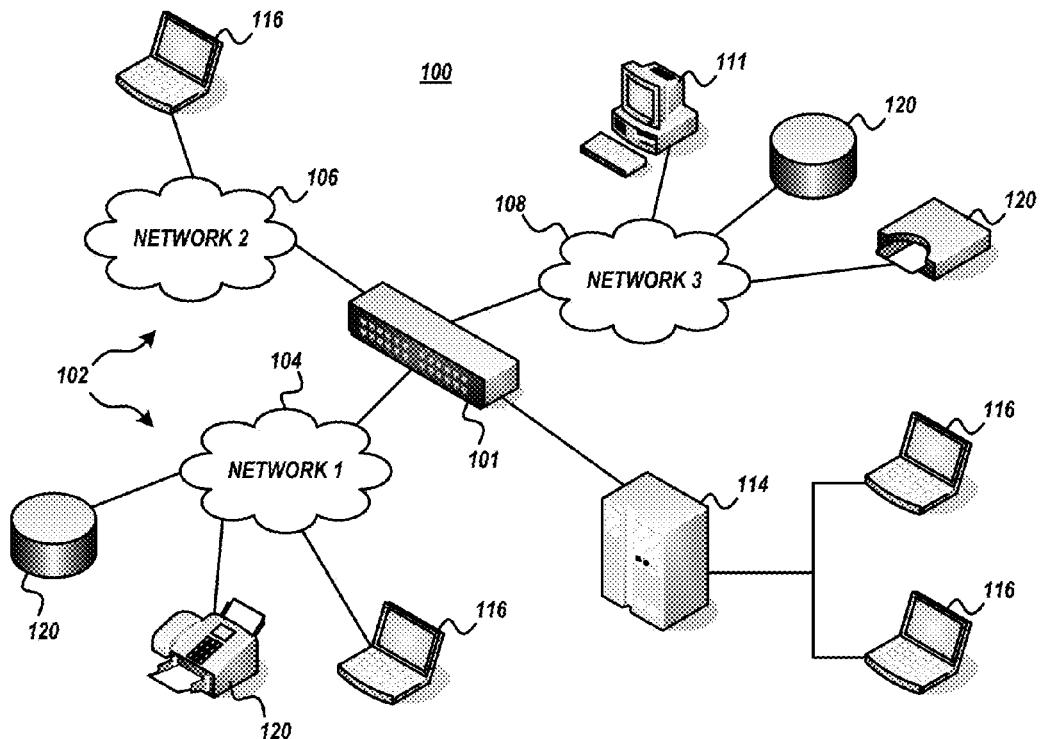
FIG. 1 depicts a network architecture, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with various embodiments. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
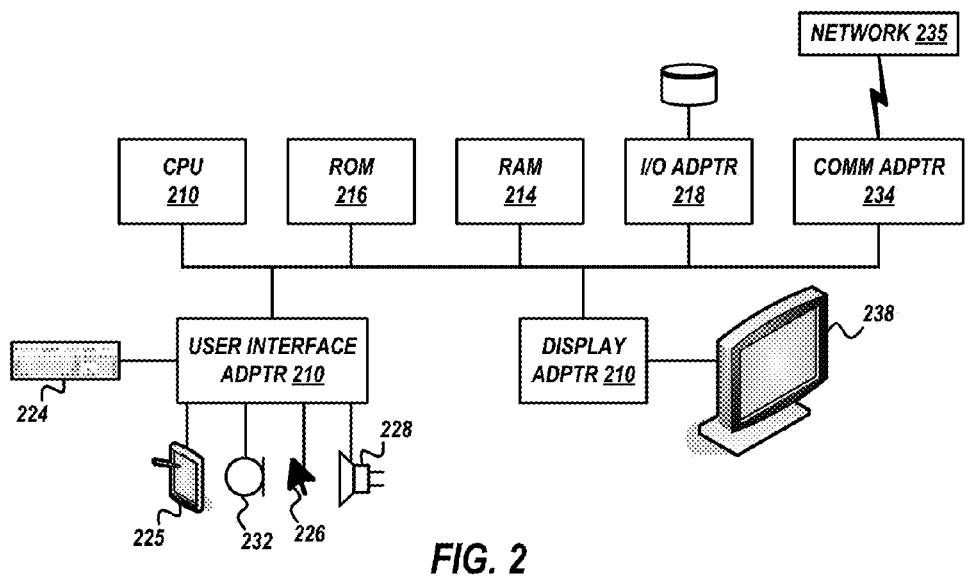
FIG. 2 depicts an exemplary data handling system associated with one or more of the network devices depicted in FIG. 1, according to various embodiments of the present invention.

FIG. 2 shows an exemplary data handling system associated with a user device 116 and/or server 114 of FIG. 1, in accordance with one embodiment. FIG. 2 illustrates a representative data handling system having a central processing unit (CPU) 210, such as a microprocessor, and a number of other units interconnected via one or more buses 212 which may be of different types, such as a local bus, a parallel bus, a serial bus, etc., according to several embodiments.

The data handling system in FIG. 2 may include a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen 225, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML; C, and/or C++ language, or other programming languages, along with an object oriented programming methodology. Object oriented programming (OOP), which has become increasingly used to develop complex applications, may be used.

Figure 3:
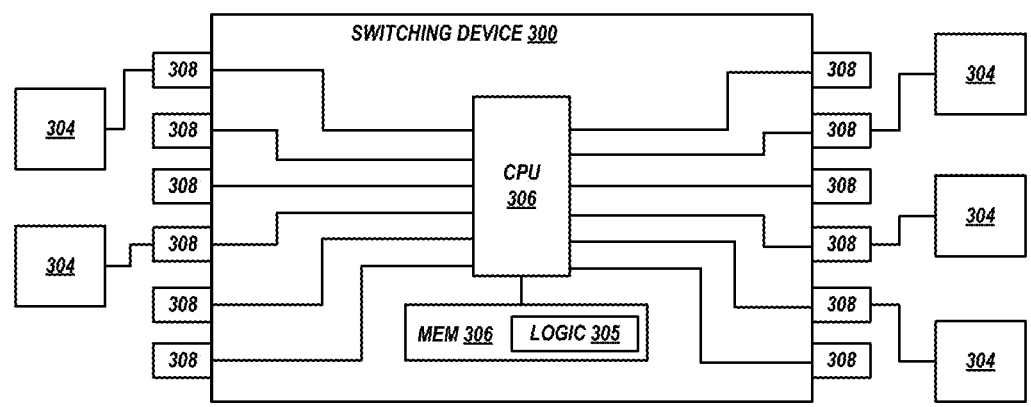
FIG. 3 depicts an exemplary switching device, according to various embodiments of the present invention.

Referring now to FIG. 3, a switching device 300 is shown according to one embodiment. As shown, the switching device 300 comprises one or more processors 306, such as a dynamic host configuration protocol (DHCP) server processor, adapted for assigning and managing device addresses for devices 304 (e.g. servers 114, user devices 116, and/or peripherals 120, etc.) electrically connected to the switching system 300, switching processor, etc. In certain embodiments, a single processor 306 is configured to carry out the functionality of switching device 300. Any type of processor known in the art may be used such as a central processing unit (CPU), a field programmable gate array (FPGA), an integrated circuit (IC), an application specific integrated circuit (ASIC), etc. A device addresses may comprise media access control (MAC) addresses, IP addresses, and/or any other type of device address known in the art.

Processor 306 includes an arithmetic logic unit (ALU), which performs arithmetic and logical operations, and a control unit, which extracts instructions (e.g. logic 305, software, code, program, etc.) from memory 306 and decodes and executes the instructions, calling on the ALU when required. Memory 306 may be any known storage device that allows for data to be stored and accessed by processor 306. Memory 306 may be RAM (e.g. SRAM, ROM, OTP, NOR flash, etc.), SRAM, DRAM or other such equivalents used in association with processor 306.

The processor 306 includes or has access to logic 305 configured for detecting one or more multicast routers, switches, etc. connected to one or more ports coupled to the processor 306. As will be understood by one having ordinary skill in the art upon reading the present descriptions, any detection method may be utilized to determine any multicast router, switch, etc. connected to one or more ports coupled to the switching processor 306, in various approaches.

In additional embodiments, the processor 306 includes or has access to logic 305 configured for receiving at least one data packet. In one particular embodiment, the at least one packet may be received by a packet switching ASIC from a source. The processor 306 also includes or has access to logic 305 configured for forwarding at least one packet to at least one destination. In one particular embodiment, the at least one packet may be forwarded by the packet switching ASIC. Of course, the at least one multicast packet may also be received/forwarded in any location and in any manner suitable for the presently described networking environment, as would be understood by one having ordinary skill in the art upon reading the present descriptions. In order to forward packets, processor 306 may also include or have access to logic 305 for determining the best available route or path for packet routing or transmission.

In additional embodiments, the processor 306 includes or has access to logic 305 configured for sending the at least one packet to the at least one destination. As will be understood by one having ordinary skill in the art upon reading the present descriptions, the at least one multicast packet may be sent in any suitable manner as would be understood by one having ordinary skill in the art upon reading the present descriptions. Furthermore, the sending or transmission method may vary depending on the capabilities and configuration of the particular networking environment through which the packet is traversing, etc.

In still more embodiments, the processor 306 includes or has access to logic 305 configured for creating a unicast and/or multicast route entry. While some of the embodiments of the present description refer to Internet protocol Multicast Communications (IPMC) tables, this has been done solely to assist the reader and to place the description in a context. It should be understood that any embodiments described herein may be directed to protocols other than internet protocol (IP) and the IPMC table thus described may be, more generally, a MC table. As such, the switching processor includes or has access to logic 305 configured for creating a unicast and or multicast route entry in an IPMC table, MC table, etc. In some approaches, the MC table may be installed, for example, to an ASIC of the processor 306. In a preferred approach, the MC table is installed as a single entry in, e.g. ASIC of processor 306.

Moreover still, the processor 306 further includes or has access to logic 305 configured for installing a drop entry in the IPMC table upon determining that a route entry is disabled.

The drop entry may take many forms, and includes a switching device address, group address and/or a mask. In many embodiments, the drop entry address is configured such that one or more multicast packets in an exemplary network environment are associated with a switching device, group, etc. corresponding to the drop entry address.

Still further, the processor 306 includes or has access to logic 305 for determining whether a link that connects to an upstream network device such as a multicast router has failed and, if affirmative, disabling the one or more route entries associated therewith and enabling one other next best route entry. For example, when the link that connects to an upstream multicast router experiences a failover in a vLAG PIM topology, a first vLAG switch may delete an associated route entry as per the PIM-DM protocol. The first vLAG switch may also update an associated source route via one or more vLAG inter-switch link (ISL) ports. The first vLAG switch may send a ROUTEUPDATE message to a second vLAG switch instructing the second vLAG peer switch to receive data traffic from the upstream multicast router that would have been received by the first vLAG switch but for the failover. When the second vLAG switch receives the ROUTEUPDATE message on one or more vLAG ISL ports comprised within the second vLAG switch, it begins to forward that data traffic from the upstream multicast router to the first vLAG switch via the ISL connection. In this manner, the first vLAG switch may initiate the next best route update processes.

Still further, the processor 306 includes or has access to logic 305 for determining whether a link that connects another network device to an upstream network device has a failover condition and, if affirmative, disabling the one or more route entries associated therewith and enabling one other route entry. For example, the second vLAG switch may determine or be instructed that it is implemented in a new route from the upstream multicast router to the first vLAG switch. The second vLAG switch may send a NEWSOURCE message to the first vLAG switch via the ISL connection instructing the first vLAG switch it may be a new source for the data traffic from the upstream multicast router that would have been received by the first vLAG switch but for the failover. Upon reception of the NEWSOURCE message, the first vLAG switch may determine whether the best route to the upstream multicast router is through the ISL connection via the second vLAG switch. An affirmative determination may trigger the first vLAG switch to send the second vLAG switch the ROUTEUPDATE message to instruct the second vLAG switch to receive data traffic from the upstream multicast router that would have been received by the first vLAG switch but for the failover and instruct the second vLAG switch to begin transmitting the data traffic to the first vLAG switch via the ISL connection. In this manner, the second vLAG switch may initiate the next best route update processes.

Figure 4:
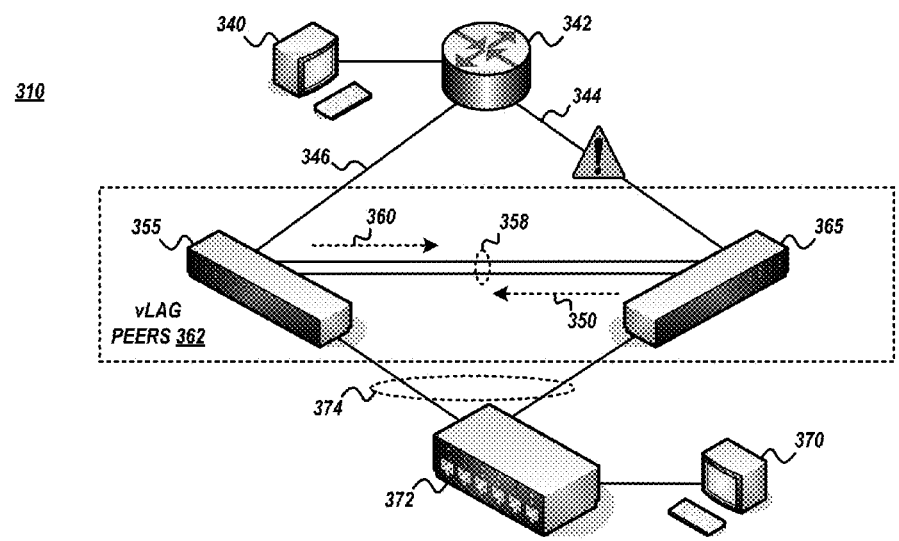
FIG. 4 depicts an exemplary network switching architecture, according to various embodiments of the present invention.

FIG. 4 depicts an exemplary network switching architecture 310, according to various embodiments of the present invention. Network switching architecture 310 includes a source 340, a plurality of vLAG switches 355, 365 that form at least one vLAG peer group 362, and a receiver 370. In certain implementations network switching architecture 310 may also include an upstream network device such as a multicast router 342, a downstream network device such as an access switch 372, and/or other network devices or components. In certain embodiments, source 340 and receiver 370 may be e.g. a server 114, a user device 116, and/or a peripheral 120, etc.

vLAG switches 355, 365 may be configured switching devices 300, respectively, that form a vLAG peer group 362 that appear as a single virtual entity. In certain embodiments, vLAG peer group 362 appear as a single virtual entity to downstream network devices only. vLAG switches 355, 365 within a vLAG peer group 362 may synchronize a logical view of combined physical vLAG switches 355, 365 ports and may internally manage and prevent implicit data traffic loops. A vLAG 374 connection consists of multiple ports of vLAG peers, which are connected to one downstream logical client device such as a server, switch (e.g. access switch 372, etc.), or another vLAG device. The vLAG 374 connection is the physical connection that allows the vLAG peer group 362 to logically appear as a single virtual entity to downstream network devices.

vLAG switches 355, 365 each include one or more ISL ports dedicated for vLAG peer group 362 connection and are interconnected by a dedicated inter-switch link (ISL) 358. The ISL ports used to create the ISL 358 may have the following properties: the ISL ports may be assigned or dedicated to a similar virtual LAN; the ISL ports may have active vLAN tagging; the ISL ports may be placed into a regular port trunk group. In certain implementations, two ports on each vLAG switch 355, 365 are assigned for ISL 358.

vLAG switches 355, 365 provide one or more data paths for communicating data from the source 340 to the receiver 370, or visa versa. For example, vLAG switch 355 and vLAG switch 365 may be connected to multicast router 342 via link 346 and link 344, respectively. Multicast router 342 may be connected to source 340 as is known in the art. Further for example, vLAG switch 355 and vLAG switch 365 may be connected to access switch via vLAG connection 374. Access switch 372 may be connected to receiver 370 as is known in the art.

According to various embodiments of the present invention, in certain instances a particular link (e.g. 344, etc.) may experience a failover condition (e.g. a fault, the interface is dropped, etc.) such that data transmission thereupon fails. Therefore, according to the description herein, the embodiments of the invention provide faster link failover recovery and minimal packet loss in a vLAG PIM topology.

In particular embodiments of the present invention, link 344 may experience a failover or fault such that data transmission thereupon fails. According to a known solution, when an interface experiences a failover condition, an associated router or switch searches for the next best route and sends a graft message to source to obtain multicast traffic. If there is no best route to the source, the router or switch will simply delete the route entry and the multicast data traffic will be received by the router or switch only after the periodic prune process completes (a default 210 seconds) and an new unicast route to the source is implemented. The known solution is not efficient, and faster convergence is desirable.

Therefore, in order to minimize traffic loss with improved convergence, according to various embodiments of the present invention, when link 344 fails, vLAG switches 355, 365, etc. no longer need wait for the periodic prune process for a new route to the source to be completed.

In certain embodiments, when a best route, next best route, etc. to source 340 is updated or implemented via ISL 358, vLAG switch 365 transmits a ROUTEUPDATE message 350 to vLAG switch 355 upon ISL 358 instructing vLAG switch 355 to receive data traffic from the upstream multicast router 342 that would have been received by vLAG switch 365 but for the failover. When vLAG switch 355 receives the ROUTEUPDATE message 350, it begins to forward that data traffic from the upstream multicast router 342 to vLAG switch 365 via ISL 358. As such, vLAG switch 365 may initiate an updated route process in response to link 344 failover.

In other embodiments, vLAG switch 355 may determine or be instructed that it is implemented in a new route or next best route from the upstream multicast router 348 to vLAG switch 365. vLAG switch 355 may send a NEWSOURCE message 360 to vLAG switch 365 switch via ISL 358 instructing vLAG switch 365 that vLAG switch 355 may be a new source for the data traffic from the upstream multicast router 348 that would have been received by vLAG switch 365 but for the failed link 344. Upon reception of the NEWSOURCE message 360, vLAG switch 365 may determine whether the best route to the upstream multicast router 348 is through ISL 358 via vLAG switch 355. An affirmative determination triggers vLAG switch 365 to send the vLAG switch 355 the ROUTEUPDATE message 350 to instruct vLAG switch 355 to receive the data traffic from the upstream multicast router 348. When vLAG switch 355 receives the ROUTEUPDATE message 350, it begins to forward that data traffic from the upstream multicast router 342 to vLAG switch 365 via ISL 358. In this manner, vLAG switch 355 may initiate an updated route process in response to link 344 failover.

Figures 5, 6, 7:
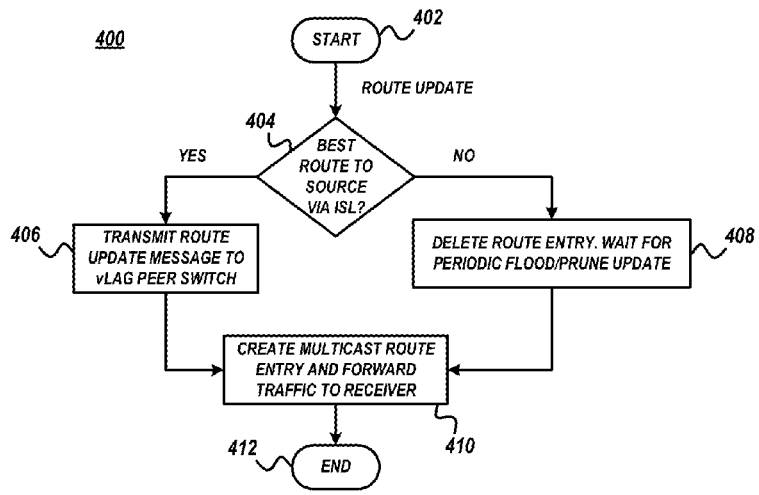
FIG. 5 depicts a flow diagram of a vLAG PIM link failover recovery process, according to various embodiments of the present invention.
FIG. 6 depicts an exemplary route update message, according to various embodiments of the present invention.
FIG. 7 depicts an exemplary new source message, according to various embodiments of the present invention.

FIG. 5 depicts a flow diagram of a vLAG PIM link failover recovery process 400, according to various embodiments of the present invention. In certain embodiments, process 400 may one or more logic modules of logic 305. Process 400 begins at block 402 when a route update is necessitated due to link 344 failover. A vLAG switch associated with the failover link, e.g. vLAG switch 365, determines if a next best route to source 340 exists, is known, or is otherwise available via ISL 358 (block 404). For example, vLAG switch 365 may determine that a route to source 340 through vLAG switch 355 is a next best route.

If the next best route to source 340 exists, is known, or is otherwise available via ISL 358, vLAG switch 365 sends ROUTEUPDATE message 350 to vLAG switch 355 via ISL 359 (block 406). vLAG switch 355 updates an associated multicast route entry and forwards data traffic to vLAG switch 365 that may, in turn, transmit the data traffic to receiver 370 (block 410). For example, the vLAG switch 355 updates a multicast route entry in its IPMC table.

If the next best route to source 340 does not exists, is not known, or is not otherwise available via ISL 358, vLAG switch 365 deletes an route entry associated with the failed link 344 and route updates may be handled as is known in the art (block 408). Process 400 ends at block 422.

FIG. 6 depicts an exemplary ROUTEUPDATE message 350, according to various embodiments of the present invention. ROUTEUPDATE message 350 may instruct vLAG switch 355 to receive data traffic from an upstream source that would have been received by vLAG switch 365 but for the failed link 344. ROUTEUPDATE message 350 may for example utilize option reserved type 3, an option length of an 8 bit message, and/or an option value route address. FIG. 7 depicts an exemplary NEWSOURCE message 360, according to various embodiments of the present invention. NEWSOURCE message 360 may instruct vLAG switch 365 that vLAG switch 355 may be a new source for upstream data traffic that would have been received by vLAG switch 365 but for the failed link 344. NEWSOURCE message 360 may for example utilize option reserved type 4, an option length of an 8 bit message, and/or an option value source address. In certain embodiments, ROUTEUPDATE message 350 and NEWSOURCE message 360 are particular PIM HELLO messages.

Figure 8:
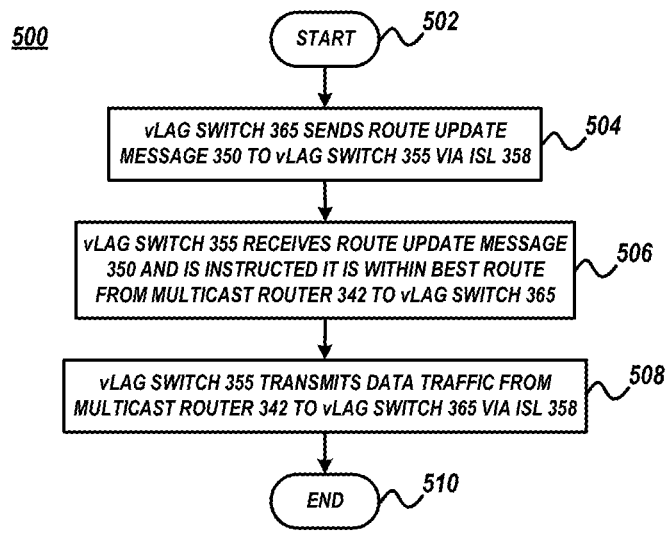
FIG. 8-FIG. 9 depicts flow diagrams of vLAG PIM link failover recovery processes, according to various embodiments of the present invention.

FIG. 8 depicts a flow diagram of vLAG PIM link failover recovery processes 500, according to various embodiments of the present invention. In certain embodiments, process 500 may be one or more logic modules of logic 305. Process 500 begins at block 502 and continues when vLAG switch 365 transmits a ROUTEUPDATE message 350 to vLAG switch 355 upon ISL 358 instructing vLAG switch 355 to receive data traffic from upstream multicast router 342 that would have been received by vLAG switch 365 but for the failed link 344 (block 504). vLAG switch 355 receives the ROUTEUPDATE message 350 and is instructed that it lies, is implemented, etc. within the next best route from multicast router 342 to vLAG switch 365 (block 506). Upon receipt of the ROUTEUPDATE message 350, vLAG switch 355 begins to forward received data traffic from the upstream multicast router 342 to vLAG switch 365 via ISL 358 (block 508). Process 500 ends at block 510.

Figure 9:
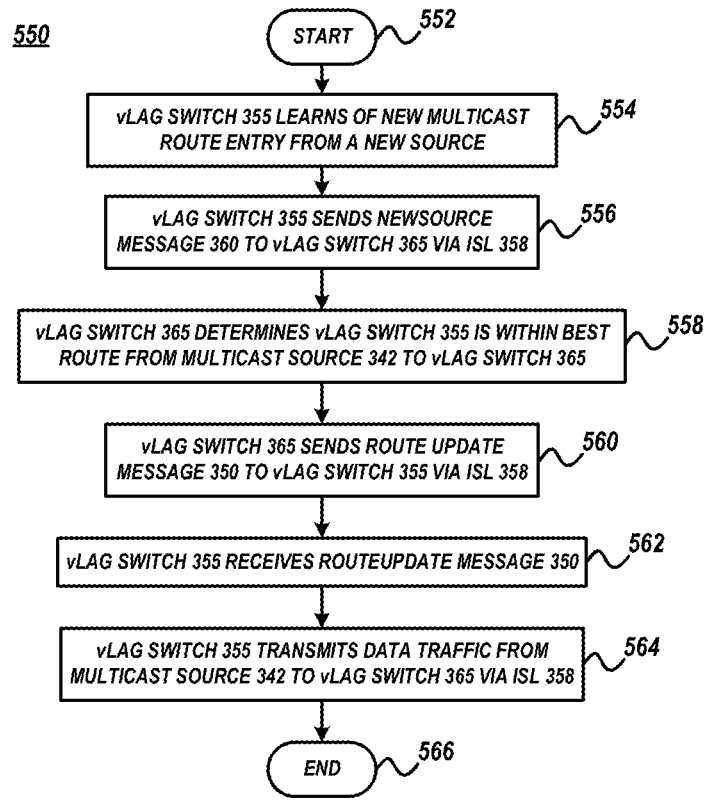

FIG. 9 depicts a flow diagram of vLAG PIM link failover recovery processes 550, according to various embodiments of the present invention. In certain embodiments, process 550 may be one or more logic modules of logic 305. Process 550 begins at block 552 and continues with vLAG switch 355 learning of a new multicast route entry from a new source 340 (block 554). For example, vLAG switch 355 may be instructed that it is implemented in a new route between the upstream multicast router 348 and vLAG switch 365. vLAG switch 355 transmits NEWSOURCE message 360 to vLAG switch 355 via ISL 358 (block 556). vLAG switch 365 determines that vLAG switch 355 lies, is implemented, etc. within a next best route for the data traffic from the upstream multicast router 348 that would have been received by the vLAG switch 365 but for the failed link 344 (block 558). For example, vLAG switch 365 may determine the next best route to the upstream multicast router is through the ISL 358. An affirmative determination may trigger, cause, etc. vLAG switch 365 to send vLAG switch 355 the ROUTEUPDATE message 350 to instruct vLAG switch 355 via ISL 358 (block 560). vLAG switch 355 receives the ROUTEUPDATE message 350 that instructs vLAG switch 355 to receive data traffic from the upstream multicast router that would have been received by the first vLAG switch but for the failed link 344 (block 562). vLAG switch 355 transmits the data traffic to vLAG switch 365 via the ISL 358 (block 564). Process 550 ends at block 566.

The drawings may be merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system for Protocol Independent Multicast (PIM) virtual link aggregation group (vLAG) fast link failover recovery, the system comprising:
    a network comprising a first vLAG switch connected to a second vLAG switch by an inter-switch link (ISL), the first vLAG switch connected to an upstream network device by a failed link and the second vLAG switch connected to the upstream network device by a functional link;
    wherein to recover from the failed link, the first vLAG switch transmits a ROUTEUPDATE message to the second vLAG switch upon the ISL that instructs the second vLAG switch to receive data traffic from the upstream network device and forward the data traffic to the first vLAG switch upon the ISL;
    wherein the second vLAG switch is instructed by the upstream network device that it is implemented in a next best route from the upstream network device to the first vLAG switch and transmits a NEWSOURCE message to the first vLAG switch upon the ISL, and;
    wherein receipt of the NEWSOURCE message causes the first vLAG switch to transmit the ROUTEUPDATE message to the second vLAG switch upon the ISL.

2. The system of claim 1, wherein when the second vLAG switch receives the ROUTEUPDATE message from the first vLAG switch, the second vLAG switch requests the data traffic from the upstream network device upon the functional link.

3. The system of claim 1, wherein the first vLAG switch determines that the second vLAG switch is implemented in the next best route for data traffic from the upstream network device that would have been received by the first vLAG switch but for the failed link prior to transmitting the ROUTEUPDATE message.

4. The system of claim 1 wherein the upstream network device is a multicast router.

5. The system of claim 1, wherein the first vLAG switch and the second vLAG switch are connected to a downstream networking device by a vLAG connection.

6. The system of claim 5, wherein the first vLAG switch and the second vLAG switch appear via the vLAG connection as a single logical device to the downstream networking device.

7. A method for Protocol Independent Multicast (PIM) virtual link aggregation group (vLAG) fast link failover recovery, the method comprising:
    transmitting, with a second vLAG switch, a NEWSOURCE message to a first vLAG switch upon an inter-switch link (ISL), wherein the receipt of the NEWSOURCE message causes the first vLAG switch to transmit a ROUTEUPDATE message to the second vLAG switch upon the ISL;
    transmitting, with the first vLAG switch, the ROUTEUPDATE message to the second vLAG switch connected to the first vLAG switch by the ISL to instruct the second vLAG switch to receive data traffic from an upstream network device connected to the first vLAG switch by a failed link;
    receiving, with the second vLAG switch, data traffic from the upstream network device connected to the second vLAG switch by a functional link, and;
    forwarding, with the second vLAG switch, the data traffic to the first vLAG switch upon the ISL.

8. The method of claim 7 further comprising:
    requesting, with the second vLAG switch, data traffic from the upstream network device by the functional link when the second vLAG switch receives the ROUTEUPDATE message from the first vLAG switch.

9. The method of claim 8 further comprising:
    receiving, with the second vLAG switch, an instruction from the upstream network device that the second vLAG switch is implemented in a next best route from the upstream network device to the first vLAG switch.

10. The method of claim 7 further comprising: determining, with the first vLAG switch, that the second vLAG switch is implemented in a next best traffic route from the upstream network device to the first vLAG switch for receiving data traffic that would have been received by the first vLAG switch but for the failed link prior to transmitting the ROUTEUPDATE message.

11. The method of claim 7 wherein the upstream network device is a multicast router, wherein the first vLAG switch and the second vLAG switch are connected to a downstream networking device by a vLAG connection, and wherein the first vLAG switch and the second vLAG switch appear via the vLAG connection as a single logical device to the downstream networking device.

12. A computer program product for Protocol Independent Multicast (PIM) virtual link aggregation group (vLAG) fast link failover recovery, the computer program product comprising a non-transitory computer readable storage medium having program code embodied therewith, the program code executable to:
    transmit, with a second vLAG switch, a NEWSOURCE message to a first vLAG switch upon an inter-switch link (ISL), wherein the receipt of the NEWSOURCE message causes the first vLAG switch to transmit the ROUTEUPDATE message to the second vLAG switch upon the ISL;
    transmit, with the first vLAG switch, the ROUTEUPDATE message to the second vLAG switch connected to the first vLAG switch by the ISL instructing the second vLAG switch to receive data traffic from an upstream network device connected to the first vLAG switch by a failed link;
    receive, with the second vLAG switch, data traffic from the upstream network device connected to the second vLAG switch by a functional link, and;
    forward, with the second vLAG switch, the data traffic to the first vLAG switch upon the ISL.

13. The computer program product of claim 12 wherein the program code is further executable to:
    request, with the second vLAG switch, data traffic from the upstream network device by the functional link when the second vLAG switch receives the ROUTEUPDATE message from the first vLAG switch.

14. The computer program product of claim 13 wherein the program code is further executable to:
    receive, with the second vLAG switch, an instruction from the upstream network device that the second vLAG switch is implemented in a next best route from the upstream network device to the first vLAG switch.

15. The computer program product of claim 13 wherein the program code is further executable to:
   determine, with the first vLAG switch, that the second vLAG switch is implemented in a next best traffic route from the upstream network device to the first vLAG switch for receiving data traffic that would have been received by the first vLAG switch but for the failed link prior to transmitting the ROUTEUPDATE message.

16. The computer program product of claim 12 wherein the upstream network device is a multicast router, wherein the first vLAG switch and the second vLAG switch are connected to a downstream networking device by a vLAG connection, and wherein the first vLAG switch and the second vLAG switch appear via the vLAG connection as a single logical device to the downstream networking device.

* * * * *